(12) United States Patent
Chiang et al.

(10) Patent No.: US 10,013,767 B2
(45) Date of Patent: Jul. 3, 2018

(54) METHOD FOR MEASURING THE INTERIOR THREE-DIMENSIONAL MOVEMENT, STRESS AND STRAIN OF AN OBJECT

(71) Applicant: THE RESEARCH FOUNDATION FOR THE STATE UNIVERSITY OF NEW YORK, Albany, NY (US)

(72) Inventors: Fu-pen Chiang, East Setauket, NY (US); Lingtao Mao, Bejing (CN)

(73) Assignee: The Research Foundation for the State University of New York, Albany, NY (US)

( * ) Notice: Subject to any disclaimer, the term of this patent is extended or adjusted under 35 U.S.C. 154(b) by 95 days.

(21) Appl. No.: 15/033,597

(22) PCT Filed: Oct. 31, 2014

(86) PCT No.: PCT/US2014/063396
§ 371 (c)(1),
(2) Date: Apr. 29, 2016

(87) PCT Pub. No.: WO2015/066458
PCT Pub. Date: May 7, 2015

(65) Prior Publication Data
US 2016/0275688 A1    Sep. 22, 2016

Related U.S. Application Data

(60) Provisional application No. 61/898,993, filed on Nov. 1, 2013.

(51) Int. Cl.
*G06T 7/514*    (2017.01)
*G06T 7/00*    (2017.01)
(Continued)

(52) U.S. Cl.
CPC .......... *G06T 7/0055* (2013.01); *G01B 11/16* (2013.01); *G06T 7/001* (2013.01); *G06T 7/37* (2017.01);
(Continued)

(58) Field of Classification Search
CPC ....... H04N 13/0275; G06T 7/35; G06T 7/514; G06T 7/001
See application file for complete search history.

(56) References Cited

U.S. PATENT DOCUMENTS 4,969,106 A † 11/1990 Vogel
6,748,112 B1 * 6/2004 Nguyen ................ F01D 21/003
348/92
(Continued)

*Primary Examiner* — Iman K. Kholdebarin
*Assistant Examiner* — Mai Tran
(74) *Attorney, Agent, or Firm* — Alan M. Sack; Kimberley Elcess; SACK IP Law p.c.

(57) ABSTRACT

A method of determining interior three-dimensional movement, deformation and strain in an object is provided. The method includes constructing a reference volume image, constructing a deformed volume image, wherein the deformed volume image represents the object after an applied stress and strain. The method further includes comparing the reference volume image and the deformed volume image to determine at least one displacement vector at least one of the x, y, and z directions. In addition it includes making a comparison for size of speckle features measured within the object. Based upon the at least one displacement vector, interior three-dimensional movement, deformation and strain can be measured for the object resulting from the applied stress and strain.

12 Claims, 19 Drawing Sheets

(51) Int. Cl.
*G01B 11/16* (2006.01)
*G06T 7/37* (2017.01)

(52) U.S. Cl.
CPC .... *G06T 7/514* (2017.01); *G06T 2207/10072* (2013.01); *G06T 2207/20056* (2013.01); *G06T 2207/30108* (2013.01)

(56) References Cited

U.S. PATENT DOCUMENTS

| | | | |
|---|---|---|---|
| 6,757,423 B1 | 6/2004 | Amini | |
| 7,298,908 B2* | 11/2007 | Lewis | G06E 1/02 382/211 |
| 7,639,866 B2* | 12/2009 | Pomero | G06T 17/00 382/128 |
| 8,035,639 B2* | 10/2011 | Witte | G06K 9/00208 345/419 |
| 2002/0067480 A1* | 6/2002 | Takahashi | G01N 21/3581 356/317 |
| 2003/0016366 A1* | 1/2003 | Takeda | G01B 11/2509 356/604 |
| 2003/0023947 A1* | 1/2003 | Sakakura | B60R 16/0207 716/126 |
| 2004/0080758 A1* | 4/2004 | Ban | G01B 11/25 356/603 |
| 2006/0034490 A1* | 2/2006 | Mihara | G06K 9/00335 382/107 |
| 2007/0025612 A1* | 2/2007 | Iwasaki | G01B 11/25 382/154 |
| 2009/0253980 A1* | 10/2009 | Wollenweber | A61B 6/032 600/411 |
| 2009/0284529 A1* | 11/2009 | De Aguiar | G06T 13/40 345/420 |
| 2010/0295854 A1* | 11/2010 | Miller | G06K 9/00208 345/427 |
| 2011/0050692 A1* | 3/2011 | Zhang | G06T 3/0093 345/424 |
| 2011/0150310 A1* | 6/2011 | Endo | G06T 7/0012 382/131 |
| 2011/0206260 A1* | 8/2011 | Bergmans | G01R 33/543 382/131 |
| 2012/0095699 A1 | 4/2012 | Angelsen et al. | |
| 2012/0249551 A1* | 10/2012 | Chernoff | G06T 7/35 345/420 |
| 2013/0135450 A1* | 5/2013 | Pallone | A61B 5/0091 348/50 |
| 2014/0022253 A1* | 1/2014 | Nakagawa | G06T 19/20 345/427 |
| 2014/0365140 A1* | 12/2014 | Popilka | A61C 19/04 702/19 |

\* cited by examiner
† cited by third party (a) Volume image (b) Slice image (a) Mean bias error (b) Standard deviation (a) Medium sandstone   (b) Red sandstone (c) Reservoir sandstone   (d) Mortar (a) u displacement field 3D contours (b) v displacement field 3D contours (c) w displacement field 3D contours (a) Medium Sandstone (b) Red Sandstone

METHOD FOR MEASURING THE INTERIOR THREE-DIMENSIONAL MOVEMENT, STRESS AND STRAIN OF AN OBJECT

RELATED APPLICATIONS AND CLAIMS OF PRIORITY

This patent application claims the benefit of priority to U.S. Provisional Patent Application Ser. No. 61/898,993, filed on Nov. 1, 2013, titled "Method for measuring the interior three-dimensional movement, stress, and strain of an object," the disclosure of which is hereby incorporated by reference in its entirety.

FIELD OF THE INVENTION

This invention relates to the field of volumetric speckle photography, and especially digital volumetric speckle photography. In particular, the invention relates to a method for measuring interior three-dimensional movement, deformation, and strain of an object having speckle features that are either naturally present or artificially seeded.

BACKGROUND

Digital speckle photography technique evolves from the original speckle photography technique developed years before the invention of lasers. The technique involves exploiting the changing position of speckles, either naturally occurring or artificially seeded, to determine changes to an object as a result of deformation. Over the years, speckle photography has evolved into techniques such as laser speckle photography, electron speckle photography, white light speckle photography, and one-beam laser speckle interferometry.

Up until the advent and ubiquitous usage of digital camera, the process of generating useful information from a specklegram is nearly always done by using a laser beam. In the pointwise approach, a narrow laser beam is directed at a point of a double exposed specklegram, the resulting diffraction pattern consists of a circular halo within which a Young's fringe pattern is displayed representing the displacement vector experienced by the small cluster of speckles within the diameter of the laser beam. For the full field approach, an optical spatial filtering process is employed to display the displacement contours resolved along a particular direction with a sensitivity corresponding to the particular spatial frequency. In the early 1990s the process was digitalized. Examples of such digitizing methods are described in detail in Chen et al. (1) (*Computer-aided Speckle Interferometry Using Spectral Amplitude Fringes*, App. Opt., 1993, 32(2):225-236; incorporated by reference in its entirety) and Chen et al. (2) (*Digital Speckle Displacement Using a Complex Spectrum Method*, App. Opt., 1993, 32(11): 1839-1849; incorporated by reference in its entirety).

In the typical prior art full-field approach, a two-step Fourier transform (via FFT) algorithm is used, rendering the software computationally efficient. The software is often referred to as CASI (Computer Aided Speckle Interferometry). In CASI, the digital speckle patterns before and after deformation are divided into sub-images of a certain pixel array, for example, 32×32 pixels. The speckle patterns within the sub-images are "compared" with the corresponding one after the specimen is deformed, via a 2D Fourier transform process with a numerical multiplier. After another 2D Fourier transform operation an impulse function is obtained whose position vector is nothing but the displacement vector collectively experienced by the cluster of speckles within the sub-image. Thus by scanning through all the sub-images pairs, the displacement field of the entire area can be obtained. And the strain field can also be obtained using an appropriate strain-displacement relation.

Many attempts have been tried to transform the 2D speckle photography technique into a true three dimensional one with the capability of measuring internal strain field. For a transparent material, speckles can be seeded or embedded inside a 3D solid, and a beam or a sheet of light can be used to probe the interior strain at isolated points or planes. These approaches are tedious and time consuming and one can only probe a few planes. Furthermore, many important mechanics problems cannot be simulated by a transparent material.

SUMMARY

In view of the above-described problems, needs, and goals, novel methods for providing a high efficient measurement of interior three-dimensional (3D) movement, deformation and strain of an object are provided. In particular, the object includes speckle features that are either naturally present or artificially seeded.

In a particular embodiment, a method of determining interior three-dimensional movement, deformation and strain in an object is described. The method includes utilizing an imaging device in constructing a reference volume image and a deformed volume image of the object (the deformed volume image represents the object after an applied stress and strain). A computational device, such as a computer, is then utilized to compare the reference volume image and the deformed volume image in order to determine at least one displacement vector in at least one of the x, y, and z directions. In addition, interior movement of the object is determined based upon at least one displacement vector in at least one of the x, y, and z directions. The quantified results of the comparison are then provided.

The disclosed embodiment's method further includes dividing the reference volume image and the deformed volume image into reference image and deformed image subsets comprising voxel arrays. The disclosed embodiment's method further includes comparing the reference image subset and the deformed image subset based upon a comparison of the sizes of speckle features in the object. The speckle features comprise of at least one of naturally occurring and artificially seeded materials.

Additionally, comparing the reference image subset and the deformed image subset includes applying a first-step fast Fourier transform to a plurality of speckle subset pairs selected from the reference image subset and the deformed image subset. Thereafter the method comprises constructing a new resultant spectrum based upon results of this first-step fast Fourier transform.

In an embodiment, the disclosed method further includes applying a second-step fast Fourier transform to the resultant spectrum and determining a crest of an expanded impulse function from the results of the second-step Fast Fourier transform. Thereafter, at least one displacement vector between two subsets is determined by determining the crest of the expanded impulse function.

The disclosed method further includes obtaining an array of displacement vectors of a plurality subsets by determining displacement vectors of a plurality of subsets based on the crest of the expanded impulse function. Additionally, the disclosed method includes calculating strain tensors based upon the array of displacement vectors of a plurality of subsets. Finally, the disclosed method includes calculating the strain sensors based on an iterative least-squares algorithm.

The disclosed embodiment(s) further include a system of determining the three-dimensional movement, deformation, and strain of an object. The system comprises an imaging device utilized to construct a reference volume image of an object and a deformed volume image of the object, in which the deformed volume image represents the object after an applied stress and strain. A computational device is utilized to compare the reference volume image and the deformed volume image in order to determine at least one displacement vector in at least one of the x, y, and z directions. The interior movement of the object is also determined based upon at least one displacement vector in at least one of the x, y, and z directions, and provide an output quantifying the results of the comparison.

The computational device of the system may be further utilized to divide the reference volume image into a reference volume image subset and the deformed volume image into a deformed image subset. Both the reference image and deformed image subsets are comprised of voxel arrays. The system then compares the reference image subset and the deformed image subset based upon a comparison of sizes of speckle features in the object, in which the speckle features comprise of at least one of naturally occurring and artificially seeded materials.

Comparing the reference image subset and the deformed image subset in the system can be done by utilizing the computational device to apply a first-step Fourier transform to a plurality of speckle subset pairs selected from each of the reference image subset and the deformed image subset. Then a new resultant spectrum can be constructed based upon results of the first-step fast Fourier transform. The system further comprises utilizing the computational device to apply a second-step Fourier transform to the resultant spectrum, and determine a crest of an expanded impulse function from the results of the second-step Fast Fourier transform. The system then utilizes the computational device to determine at least one displacement vector between two subsets based on the crest of the expanded impulse function. It then obtains an array of displacement vectors of a plurality of subsets by determining displacement vectors of a plurality of subsets based on the crest of the expanded impulse function.

Finally, the system comprises utilizing the computational device to calculate strain tensors of the array of displacement vectors of a plurality of subsets based on an iterative least squares algorithm.

These and other characteristics of the methods and processes will become more apparent from the following description and illustrative embodiments which are described in detail with reference to the accompanying drawings. Similar elements in each figure are designated by like reference numbers and, therefore, subsequent detailed descriptions of the same or similar elements may have been omitted for brevity.

DETAILED DESCRIPTION

The disclosure is not limited only to particular systems, devices, and methods described. The system, devices, and methods may vary. The terminology used in the description is for the purpose of describing the particular versions or embodiments only, and is not intended to limit the scope.

As used in this disclosure, the singular forms "a", "an," and "the" include plural references unless the context clearly dictates otherwise. Unless defined otherwise, all technical and scientific terms used herein have the same meanings as commonly understood by any one of ordinary skill in the art.

The disclosed invention provides a new highly efficient method for measuring the interior three-dimensional (3D) movement, deformation and strain of an object having speckle features that are either naturally present or artificially seeded. According to the disclosed embodiment(s), the objects being measured can be transparent or opaque. The speckle features can be naturally occurring structures of objects, such as biological features in bones, myocardium, lung tissue and brain tissue. Similarly, the speckles features can be naturally occurring features in wood, porous rock and rocks with different compositions. Alternatively, objects can have artificially seeded speckles. The examples of speckle features as listed herein are by way of example only, and are not meant to limit the invention to those the features as listed.

In the disclosed embodiment(s), digital volume images of a 3D solid object are reconstructed with advanced imaging devices. For example, a micro-focus computer tomography device (micro-CT) device, an optical coherence tomography (OCT) device, a micro-nuclear magnetic resonance imaging (micro-MRI) device, and a laser scanning confocal microscope (LSCM) can be used to reconstruct the images. The reconstructed images can be divided into subsets having similar voxel arrays, and the properties of an image can be an image in one set can be compared with the properties of a corresponding image in the second set. These properties can include positioning and sizing information of the speckle features within the object. Displacement information can also be obtained by scanning through the subsets of images.

Figure 1:
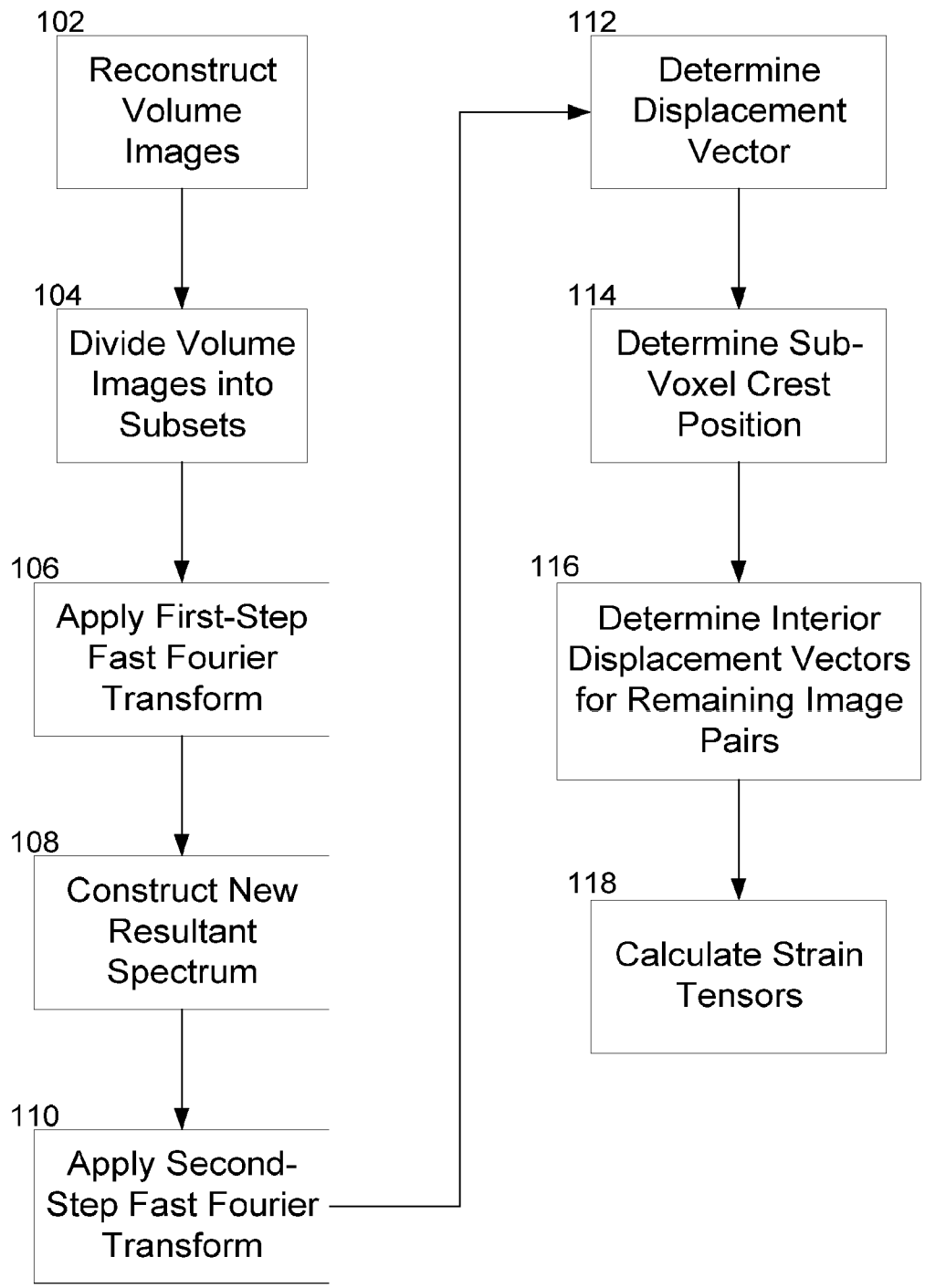
FIG. 1 shows flowchart illustrating an example of a process for measuring interior movement, deformation and strain of an object.
Figure 2:
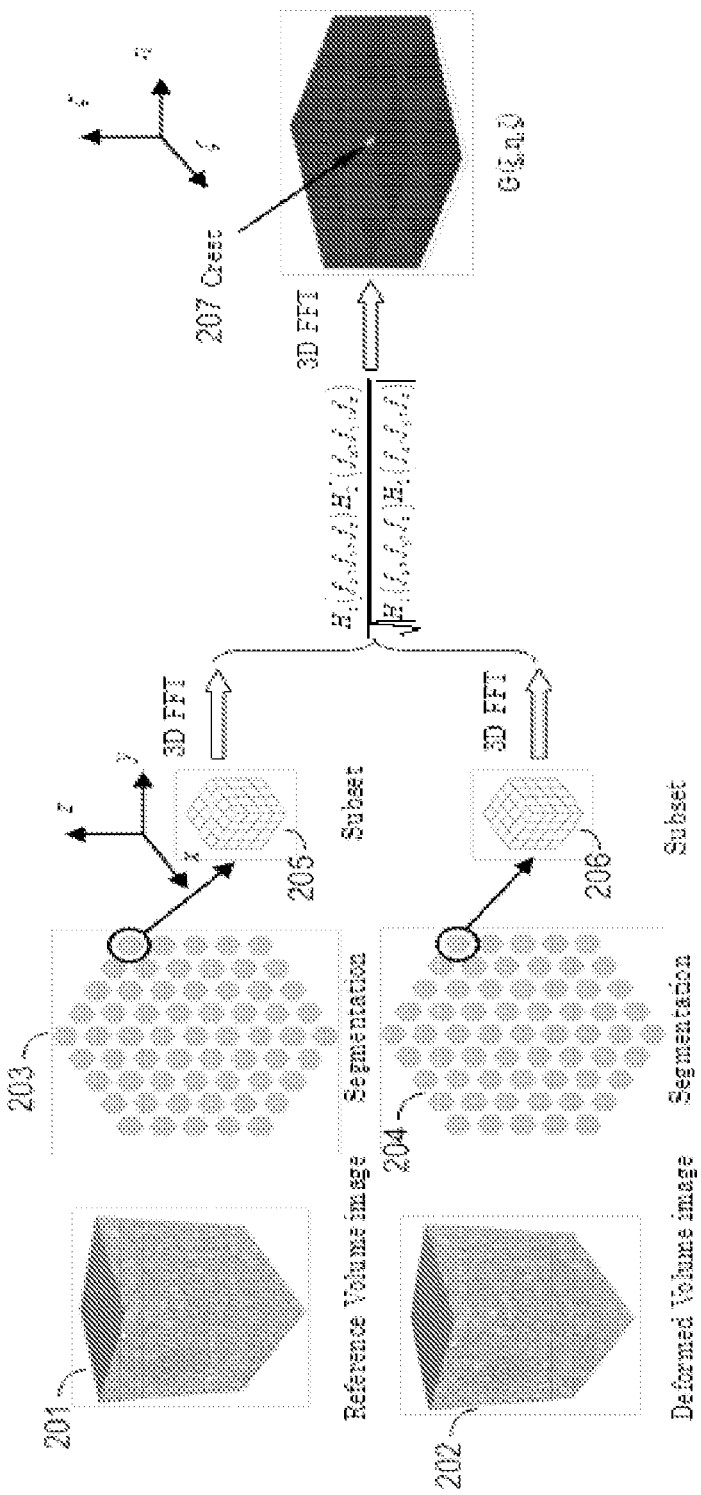
FIG. 2 shows a schematic illustration of the measurement process of FIG. 1.

FIG. 1 illustrates an exemplary process for performing a measurement method as that disclosed in this specification. FIG. 2 illustrates a schematic view of the process as described in FIG. 1 and is referred to throughout the following detailed discussion of FIG. 1. FIGS. 3-16 illustrate various examples of images and processing of imaging information obtained during various simulations and tests performed on these objects and images.

As illustrated in FIG. 1, digital volume images of a 3D solid object can be reconstructed 102 via advanced imaging techniques and devices, such as those devices listed above. Both an image of the solid object before any deformation (i.e., the reference image) as well as an image of the solid object after deformation (i.e., the deformed image) can be reconstructed 102. As shown in FIG. 2, the reference volume image 201 and the deformed volume image 202 can be constructed, segmented, and transformed via Fourier Transforms (FFT).

Figure 3:
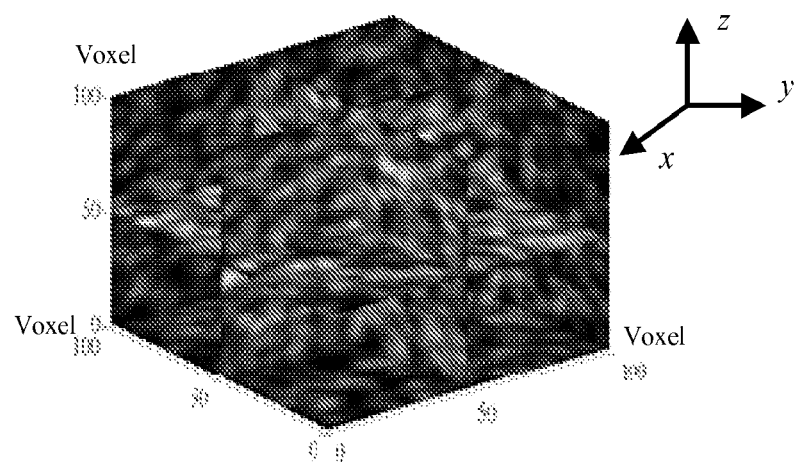
FIG. 3 shows a simulated volume image and a sectional image of an object being measured.
Figure 3:
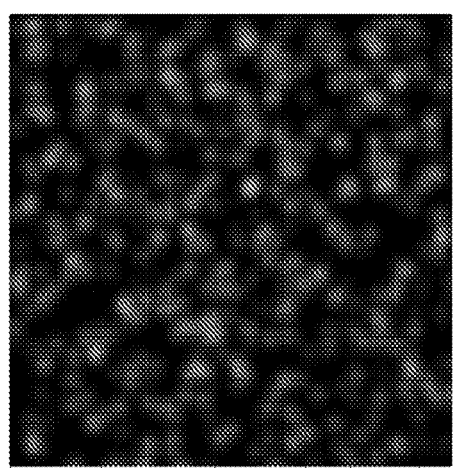

As further illustrated in FIG. 1, both the reference image and the deformed image can be divided into subsets 104 having similar voxel array sizes. As shown in FIG. 2, the reference volume image 201 can be divided into multiple subsets 203, and the deformed volume image 202 can be divided into multiple subsets 204. A simulated volume image and a slice image are shown in FIG. 3 for illustrative purposes.

For example, a voxel array size of 32×32×32 voxels can be used. The size of the subset can be set small so that deformation in the subset is neglected, and each voxel in the subset has the same displacement. Additionally, the size of the subset can vary. For example, the voxel array size can be 4×4×4 voxels, 8×8×8 voxels, 16×16×16 voxels, 64×64×64 voxels, and so on. Based upon the size of the speckle features in the object, a suitable size for the subset can be chosen.

Figure 4A:
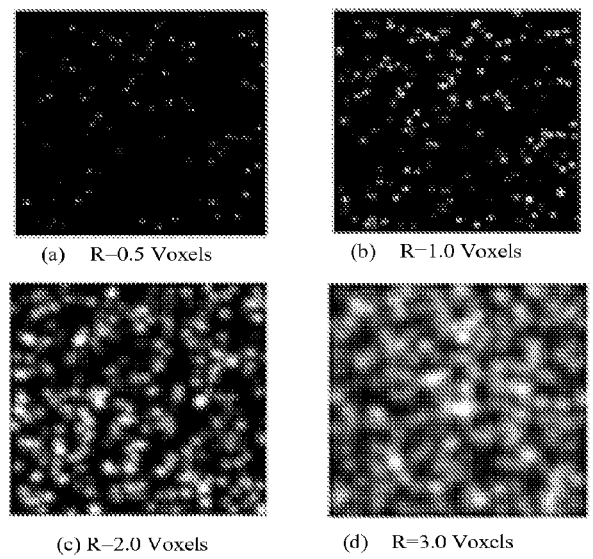
FIG. 4A shows various images of speckle patterns with different granule radius.
Figure 4B:
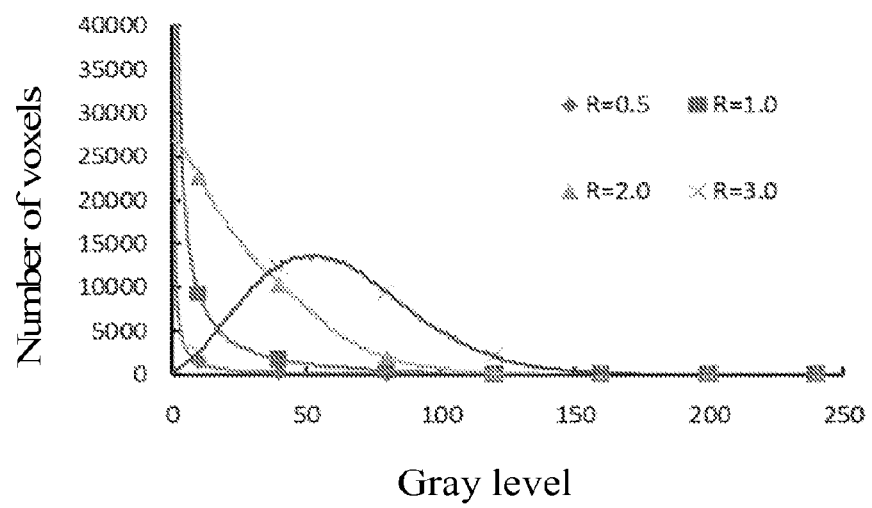
FIG. 4B shows a corresponding histogram for the images shown in FIG. 4A.

To improve precision, the subset image can include nine or more speckle features, and be arranged such that at least a portion of adjacent subset images overlap. A set of simulated volume images having varying speckle patterns as shown at increasing voxel radius values is shown in FIG. 4A for illustrative purposes, and a related histogram is provided in FIG. 4B illustrating that image contrast is decreased as a result of increasing voxel radius when measuring speckle features.

In an exemplary embodiment, $h_1(x,y,z)$ and $h_2(x,y,z)$ may represent the complex amplitudes of the light disturbance of a pair of generic volumetric speckles, before and after deformation respectively, and may be represented as reference volume image subset 205 and deformed volume subset 206. These subsets may then be represented by the following equation:

$$h_2(x,y,z) = h_1[x-u(x,y,z), y-v(x,y,z), z-w(x,y,z)] \quad (1)$$

where u, v and w are the displacement components experienced by the speckles along the x, y, and z directions respectively during the deformation, stress, and/or strain process.

Referring again to FIG. 1, a first-step 3D fast Fourier transform (FFT) can be applied 106 to both $h_1$ and $h_2$, yielding:

$$H_1(f_x, f_y, f_z) = \Im\{h_1(x,y,z)\}$$

$$H_2(f_x, f_y, f_z) = \Im\{h_2(x,y,z)\} \quad (2)$$

where $H_1(f_x, f_y, f_z)$ is the Fourier transform of $h_1(x,y,z)$, $H_2(fx, fy, fz)$ is the Fourier transform of $h_2(x, y, z)$, and $\Im$ stands for Fourier Transform. The mathematical calculations by which the above Fourier transform may be achieved is further enumerated in (3) below.

$$H_1(f_x, f_y, f_z) = \int\int\int_\Delta h_1(x, y, z) \exp[-j2\pi(xf_x + yf_y + zf_z)] \quad (3)$$

$$dxdydz$$

$$= |H_1(f_x, f_y, f_z)| \exp[j\phi_1(f_x, f_y, f_z)] H_2(f_x, f_y, f_z)$$

$$= \int\int\int_\Delta h_1(x-u, y-v, z-w) \exp$$

$$[-j2\pi(xf_z + yf_y + zf_z)] dxdydz$$

$$= |H_2(f_x, f_y, f_z)| \exp[j\phi_2(f_x, f_y, f_z)]$$

$$= |H_1(f_x, f_y, f_z)| \exp\{j[\phi_1(f_x, f_y, f_z) -$$

$$2\pi(uf_x + vf_y + wf_z)]\}$$

In the first-step 3D Fourier Transform applied above, $\Delta$ denotes the subset region, and coordinates $(f_x, f_y, f_z)$ are the spectral-domain coordinates after the first-step 3D FFT, which are the spectral-domain coordinates after the first-step 3D FFT, $H_1(f_x, f_y, f_z)$ is $h_1(x,y,z)$ after the first-step 3D FFT, $|H_1(f_x, f_y, f_z)|$ and $\phi_1(f_x, f_y, f_z)$ are spectral amplitude and phase fields of $H_1(f_x, f_y, f_z)$, $H_2(f_x, f_y, f_z)$ is $h_2(x,y,z)$ after the first-step 3D FFT, and $|H_2(f_x, f_y, f_z)|$ and $\phi_2(f_x, f_y, f_z)$ are spectral amplitude and phase fields of $H_2(f_x, f_y, f_z)$.

From the two procured spectra $H_1(f_x, f_y, f_z)$ and $H_2(f_x, f_y, f_z)$, a new resultant spectrum can be constructed 108 by one of the following equations:

$$F(f_x, f_y, f_z) = \frac{H_1(f_x, f_y, f_z) H_2^*(f_x, f_y, f_z)}{|H_1(f_x, f_y, f_z) H_2(f_x, f_y, f_z)|^{1-\alpha}} \quad (4)$$

or

-continued $$F(f_x, f_y, f_z) = \\ |H_1(f_x, f_y, f_z)H_2(f_x, f_y, f_z)|^\alpha \exp\{j[\phi_1(f_x, f_y, f_z) - \phi_2(f_x, f_y, f_z)]\} \quad (5)$$

where α is an appropriate constant (0≤α≤1).

The resultant spectrum can be processed by applying 110 a second-step 3D FFT by inserting equation 2 as listed above into equation 3, providing:

$$F(f_x, f_y, f_z) \approx |H_1(f_x, f_y, f_z)|^{2\alpha} \exp[j2\pi(uf_x + vf_y + wf_z)] \quad (7)$$

and $$G(\xi, \eta, \zeta) = \int\int\int_{\Delta_f} F(f_x, f_y, f_z) \exp[-j2\pi(f_x\xi + f_y\eta + f_z\zeta)] \\ df_x df_y df_z \\ \approx \int\int\int_{\Delta_f} |H_1(f_x, f_y, f_z)|^{2\alpha} \exp\{-j2\pi[f_x(\xi - u) + \\ f_y(\eta - v) + f_z(\zeta - w)]\} df_x df_y df_z \\ = \overline{G}(\xi - u, \eta - v, \zeta - w)$$

where $\Delta_f$ represents the first spectral domain, (ξ, η, ζ) represent the spectral-domain coordinates after the second-step 3D FFT, and $\overline{G}(\xi-u, \eta-v, \zeta-w)$ is an expanded impulse located at (u,v,w). By detecting the crest of the expanded impulse function $\overline{G}(\xi-u, \eta-v, \zeta-w)$, the local displacement vector between the two subsets can be determined 112. In addition, when this process is carried out for every corresponding pair of subsets, an array of displacement vectors for each and every subset (i.e. totaling a plurality of subsets) can be obtained. From this array of displacement vectors, strain tensors, based on a strain displacement relation, can be calculated.

The quality of the impulse function can depend on the value of the index α in equation 4. When, for example, α=0.5, the signal peak of $\overline{G}(\xi-u, \eta-v, \zeta-w)$ can focus on a sharp impulse and is stronger than the noise spectrum, and a high signal-to-noise ratio can be obtained.

Due to the discrete nature of digital volume images, the displacements determined 112 are integer multiples of one voxel. In order to obtain more accurate and sensitive characterization, a sub-voxel determination 114 of the crest position may be used. Surrounding the integer voxel of the crest, a cubic subset of, for example, 3×3×3 or 5×5×5 voxels can be selected and a tri-linear, tri-spline or tri-cubic interpolation can be employed to obtain the sub-voxel accuracy. For example, as shown in FIG. 2, the crest 207 may be surrounded by a cubic subset of voxels.

In order to accurately determine 116 the interior displacement of the entire object, all other subset image pairs can be similarly compared to accurately determine any size and positioning changes related to the speckle features within the object. For example, for each pair, the first-step 3D fast Fourier transform (FFT) can be applied 106, the new resultant spectrum can be constructed 108, the resultant spectrum can be processed 110 using a second-step 3D FFT and the local displacement vector between the two subsets can be determined 112. Thus, the 3D interior displacement of the whole field is deduced.

After the entire field displacement is determined 116, strain tensors can be calculated 118 using an appropriate strain-displacement relation. For example, internal strain field can be estimated by using an iterative least-squares (ILS) algorithm.

To compute local strain at each considered point, a regular cubic box containing (2N+1)×(2N+1)×(2N+1) discrete points centered at the considered point is selected. If the strain calculation window is small enough, the displacements in each direction can be reasonably assumed to be linearly distributed, and can be mathematically expressed as:

$$u(x,y,z) = a_0 + a_1 x + a_2 y + a_3 z$$
$$v(x,y,z) = b_0 + b_1 x + b_2 y + b_3 z$$
$$w(x,y,z) = c_0 + c_1 x + c_2 y + c_3 z \quad (8)$$

where x, y, z=−N:N are the local coordinates within the calculation box, u(x,y,z), v(x,y,z) and w(x,y,z) are the original displacements directly obtained by the two-step 3D FFT, and $a_i$(i=0, 1, 2, 3), $b_i$(i=0, 1, 2, 3), and $c_i$(i=0, 1, 2, 3) represent the unknown polynomial coefficients to be determined. Using a least-squares of multiple regression analysis, the unknown coefficients can be estimate. Then, for example, six strain components $\varepsilon_x$, $\varepsilon_y$, $\varepsilon_z$, $\varepsilon_{xy}$, $\varepsilon_{xz}$ and $\varepsilon_{yz}$ at the interrogate point can be calculated by the following mathematical equation:

$$\varepsilon_x = \frac{\partial u}{\partial x} = a_1 \quad (9)$$
$$\varepsilon_{xy} = \frac{1}{2}\left(\frac{\partial v}{\partial x} + \frac{\partial u}{\partial y}\right) = \frac{1}{2}(b_1 + a_2)$$
$$\varepsilon_y = \frac{\partial v}{\partial y} = b_1$$
$$\varepsilon_{yz} = \frac{1}{2}\left(\frac{\partial w}{\partial y} + \frac{\partial v}{\partial z}\right) = \frac{1}{2}(c_2 + b_3)$$
$$\varepsilon_z = \frac{\partial w}{\partial z} = c_1$$
$$\varepsilon_{xz} = \frac{1}{2}\left(\frac{\partial u}{\partial z} + \frac{\partial w}{\partial x}\right) = \frac{1}{2}(a_3 + c_1)$$

thus resulting in a highly accurate, highly efficient measurement of the filed strain at that particular point.

Example 1 (Computer-Simulated 3D Volumetric Speckle Patterns)

In order to examine the reliability and performance of CASI-3D, several simulations and real tests were performed. These tests were performed, in part, using computer-simulated digital volumetric images generated with the use of MATLAB codes. Other programming languages such as C, C++, and Java may be used to perform these simulations as well. The computer simulation was performed on a computer such as Lenovo Laptop (T410) with Intel Core Duo i7 CPU. However, other devices with memory capacities comparable to the Lenovo Laptop may be used as well. In addition, the imaging and the subsequent analysis or computation can be done by the same device or by separate devices. The reference image, represented by $I_r(x,y,z)$, was generated according to the following function:

$$I_r(x, y, z) = \text{int}\left\{\sum_{i=j}^{N} I_k^0 \exp\left[-\frac{(x-x_1)^2 + (y-y_k)^2 + (z-z_k)}{R^2}\right]\right\} \quad (10)$$

where int( ) returns the nearest integer around x, N is the total number of speckle granules, $I_k^0$ is a random value indicating the peak intensity of the kth speckle granule, and R is the radius of each speckle granule. In addition, ($x_k$, $y_k$, $z_k$) denotes the center location of the kth speckle granule. The deformed volume image is obtained by the Fourier shifting method. Specifically, ten different sub-voxel displacements ranging from 0.1 to 1.0 voxel were applied along the z direction, in which there was a shift of 0.1 voxels between two successive images. These volume images, with pre-imposed sub-voxel translation, were used to investigate the accuracy and precision of CASI-3D. A simulated volume image, and a corresponding sectional image is shown in FIG. 3. FIG. 4A illustrates volume images generated according to varying granular radii (i.e. from 0.5-3.0 voxels), and FIG. 4B illustrates the histograms of the slice images based on varying voxel radii, in which an increase in granule radius resulted in a gradual decrease in the contrast of the images.

Example 2 (Effect of Varying Speckle Granule Size)

Figure 5A:
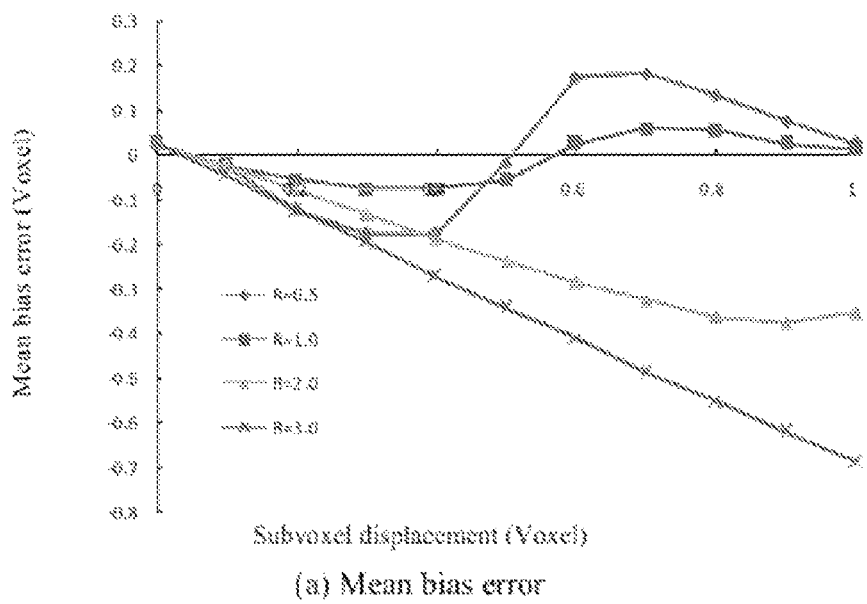
FIG. 5A shows mean bias error associated with calculation a series of sub-voxel displacements to obtain deformed volume images.
Figure 5B:
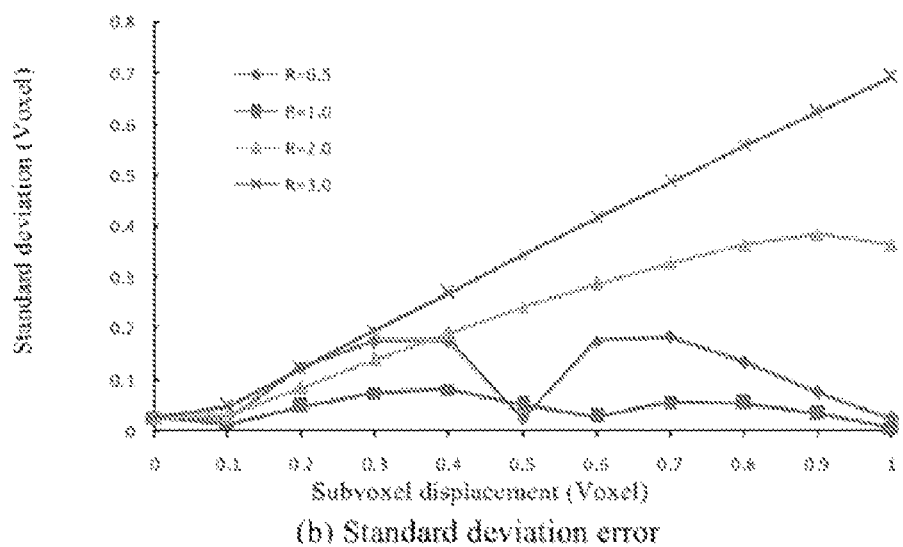
FIG. 5B shows a standard deviation related to calculating a series of sub-voxel displacements to obtain the deformed volume images.

A series of sub-voxel displacements along the z direction were imposed on each of the 4 volume images to obtain the deformed volume image. Thereafter, CASI-3D was applied to calculate the pre-assigned displacement. The subset size used in this simulation was 32×32×32 with a subset shift of 16 voxels. Calculations are performed on a grid of 60×60× 60 voxels. FIG. 5A shows the mean bias error and the standard deviation error as a result of the CASI-3D performed on this series of sub-voxel displacements. A study of FIG. 5A shows that the highest accuracy and precision of the volume image was when the granule radius was 1 voxel. A change in this radial value from 1 to 3 voxels resulted in a rapid increase in errors. A lower radial value of 0.5, as illustrated in the histogram of FIG. 4, resulted in a sharper image, and the smaller granule size associated with this radius resulted in a decrease in the image's contrast.

Mean bias and standard deviation errors, were calculated to provide insight into the functioning of CASI-3D. Mean bias in a sinusoidal distribution is caused by tri-linear, tri-spline, tri-cubic, and other interpolation methods that are used to investigate subvoxel displacement. Both these metrics (i.e. mean bias and standard deviation errors) are functions of sub-voxel displacement. The maximum mean bias error variation, represented in FIG. 5A, was highest when the displacement was between 0.3 and 0.7 voxels. Likewise, the maximum standard deviation, a function of sub-voxel displacement, is highest when the displacement is between 0.4 and 0.6 voxels. This kind of systematic error distribution is caused by the interpolation error on sub-voxel accuracy investigation. For a radius of 0.5 voxels and 1.0 voxel, the mean bias error variation is approximately a sinusoidal distribution in a period of 1 voxel.

Example 3 (Effect of Varying the Number Speckle Granules)

Figure 6A:
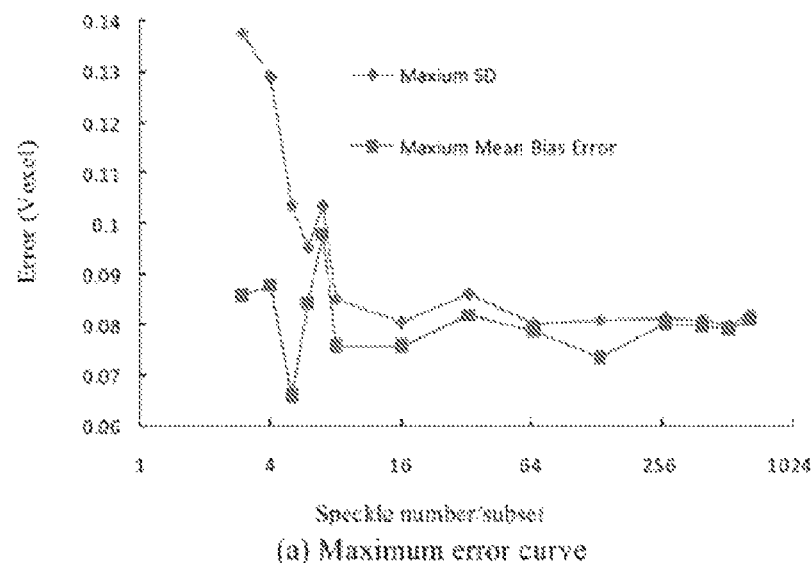
FIG. 6A shows the relationship between the maximum absolute value of the mean bias errors and the maximum standard deviation errors when the number of the speckles in each subset is increased.
Figure 6B:
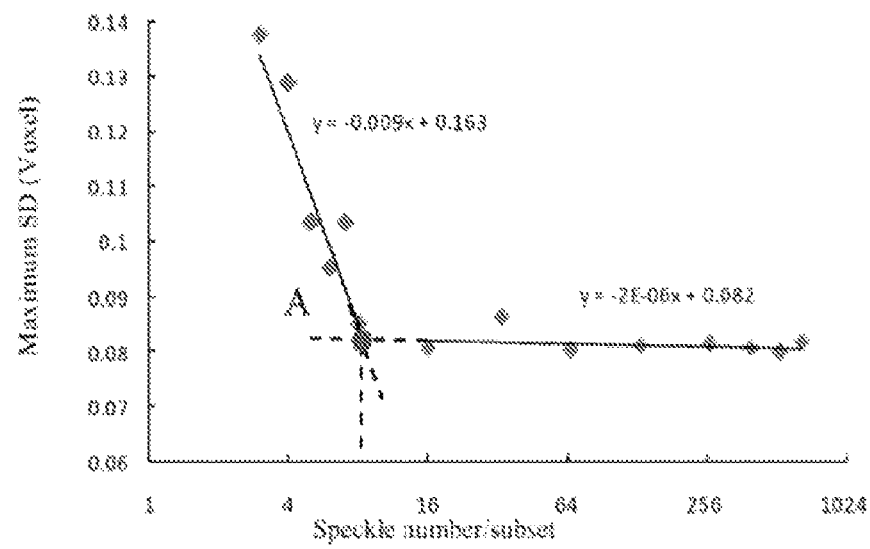
FIG. 6B shows a segmental linear fitting to fit the maximum standard deviation errors.

The manner in which the accuracy and precision of CASI-3D is influenced by speckle granules was analyzed. Several simulated speckle pattern volumes images can be generated with the volume images having a granule radius of 1 voxel. As the number of speckle granules grows from 100 to 20000, the accuracy of CASI-3D improves. Thus, increasing the speckle number gives rise to a better performance of CASI-3D. The relationships of maximum absolute value of the mean bias errors and the maximum standard deviation errors with increasing number of speckles in each subset are depicted in FIG. 6A. With an increase in the number of speckle granules, the maximum absolute value of mean bias error fluctuated slightly, and the maximum standard deviation errors dropped significantly. However, beyond a certain value, the maximum standard deviation stabilized. A segmental linear fitting, as illustrated in FIG. 6B, can be applied to maximum standard deviation errors to better understand the data. Results of the segmental linear fitting revealed that at intersection point A of FIG. 6B, a critical or threshold point was reached. This critical point was 9, and an increase beyond this point will not significantly improve the performance of CASI-3D. This result is consistent with CASI-2D.

Example 4 (Effect of Speckle Contrast and Brightness)

Figure 7A:
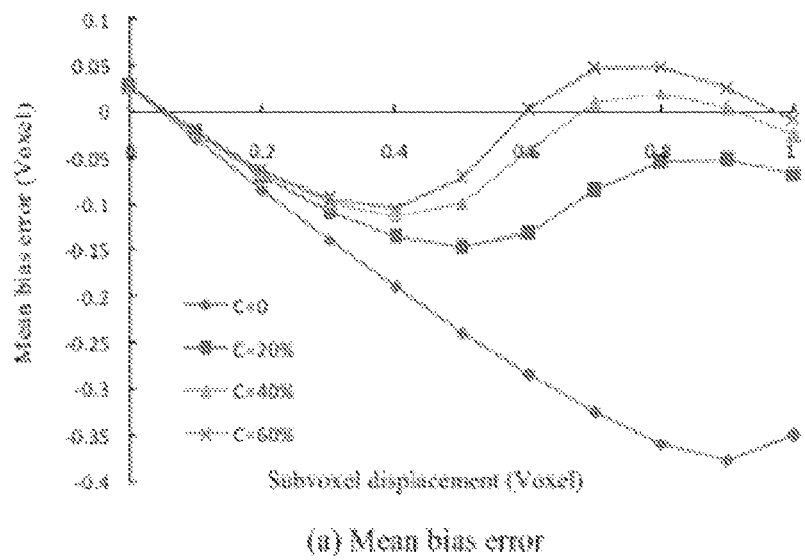
FIG. 7A, shows the mean bias and the standard deviations caused by the influence of contrast and brightness on the reference and deformation volume images.
Figure 7B:
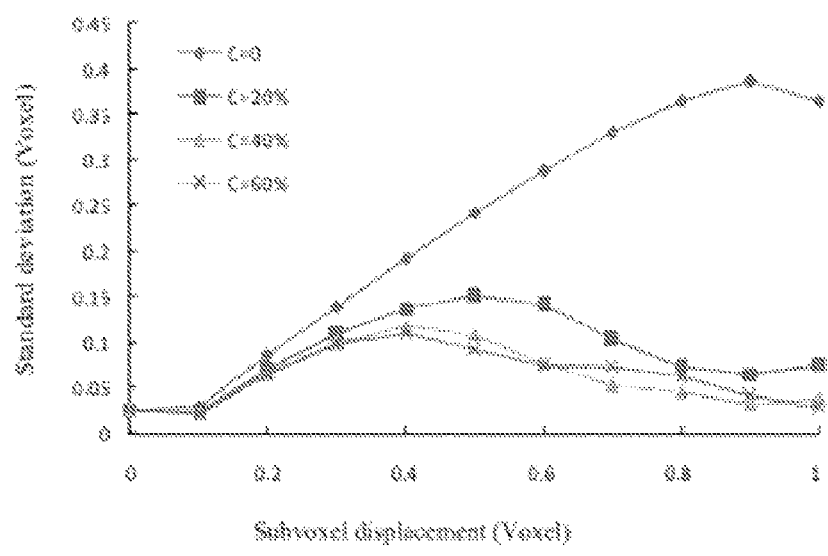
FIG. 7B shows the standard deviation of the influence of contrast and brightness on the reference and deformation volume images.

The manner in which contrast and brightness of 3D speckles influence CASI-3D were analyzed. FIGS. 7A and 7B illustrate mean bias and standard deviation errors of both the reference image and deformed image due to variations in contrast (C). Both graphs trace mean bias and standard deviations errors due to changes in contrast ranging from 0%-60%. Assuming that there are 12,000 granules, each with a speckle granule radius of 2 voxels, an increase in the value a volume image's contrast results in a decrease in the mean bias and the standard deviation errors. This indicates that increasing the contrast of images improves the accuracy of CASI-3D. However, beyond a certain critical value, the improvement in the performance of CASI-3D abates.

Figure 8A:
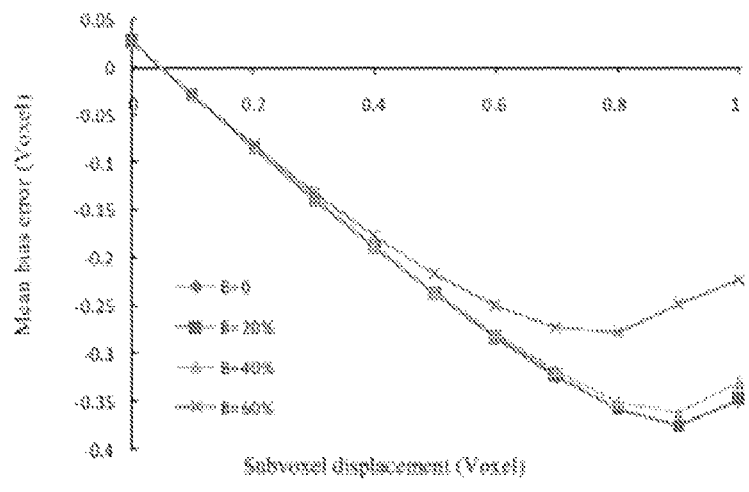
FIG. 8A shows the mean bias of the influence of brightness on the reference and deformation volume images.
Figure 8B:
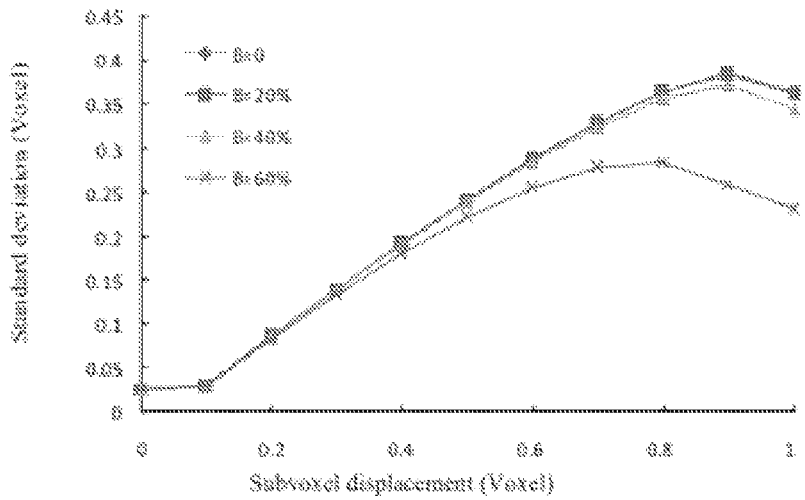
FIG. 8B shows the standard deviation of the influence of brightness on the reference and deformation volume images.
Figure 9A:
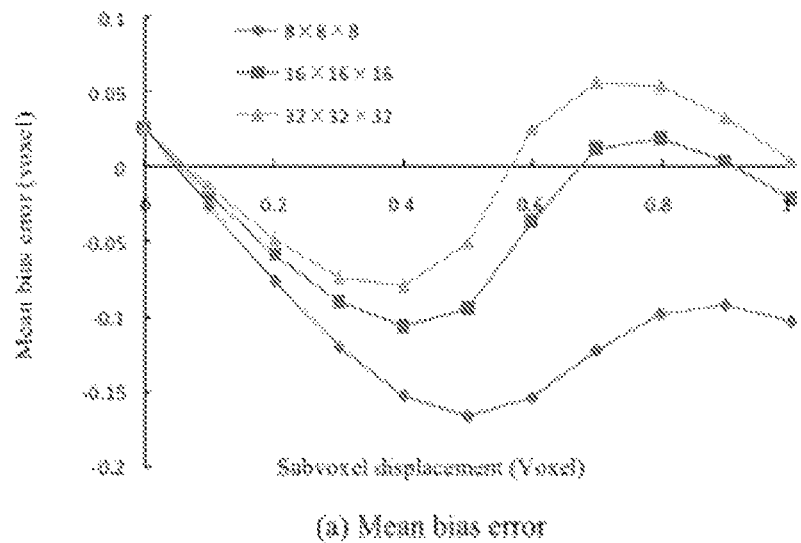
FIG. 9A shows the mean bias errors and standard deviation errors of CASI-3D as the sub-voxel displacement subsets increase in size.
Figure 9B:
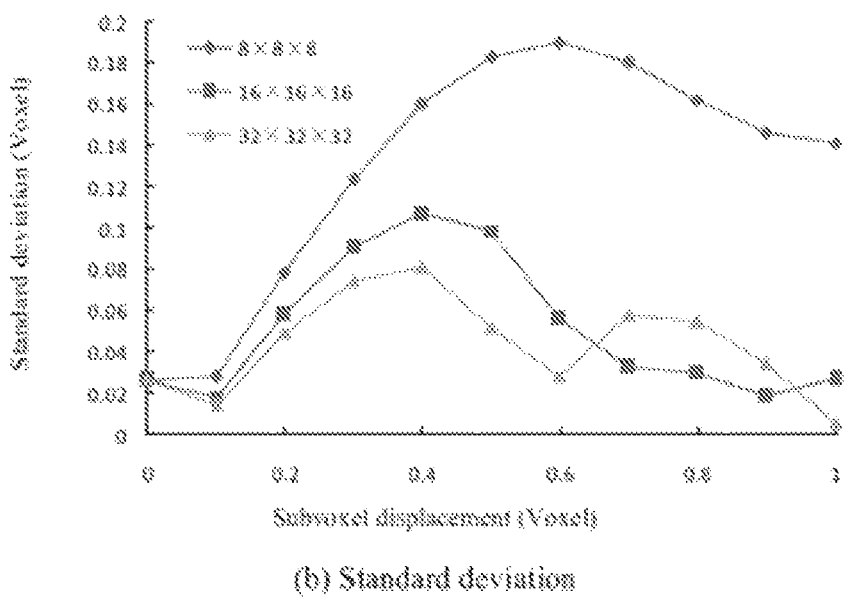
FIG. 9B shows the standard deviation errors of CASI-3D as the sub-voxel displacement subsets increase in size.

Beyond this critical value, it would be reasonable to predict that the performance of CASI-3D will no longer improve. FIGS. 8A and 8B illustrate mean bias and standard deviation errors of both the reference image and deformed image due to variations in brightness. Both these graphs trace mean bias and standard deviations errors due to changes in contrast ranging from 0%~60%. Assuming 12,000 granules, each with a speckle granule radius of 2 voxels, an increase in a volume image's brightness does not significantly affect the accuracy of CASI-3D. The data reveals CASI-3D is less sensitive to an increase brightness than an increase in contrast.

Example 5 (Effect of Varying Speckle Subset Size)

The manner in which the size of a subset of voxels influences volume images were also analyzed. Subsets comprising arrays ranging from 8×8×8 to 32×32×32 voxels were selected, and the mean bias and standard deviation errors were traced as shown FIGS. 9A and 9B. Assuming that there are 12,000 granules, each of which has a speckle radius of 2 voxels, an increase in the size of the subset results in a resultant increase in both the accuracy and precision of CASI-3D.

When the subset size is 8×8×8 voxels, the number of speckle in each subset is 6. This number is significant because it is less than the speckle size of 9, which represents the number needed to achieve optimal CASI-3D performance in a particular embodiment. Calculating the displacement of a subset sized 8×8×8 voxels consumes 0.25 seconds, calculating the displacement of one with 32×32×32 voxels consumes 0.97 seconds. Thus, as the subset size increase, the calculation time increases as well.

Example 6 (Applying CASI-3D to CT Volume Images of Porous Rocks)

Figure 10:
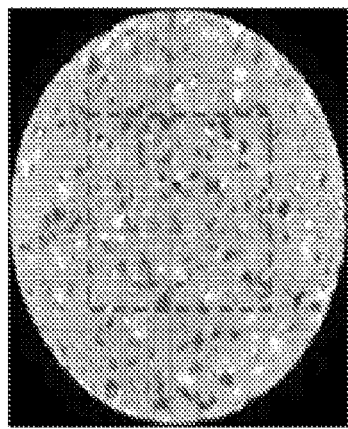
FIG. 10 shows CT images of various types of rocks and mortar, specifically, of histograms of the medium sandstone, the red sandstone, the mortar, and the reservoir sandstone.
Figure 10:
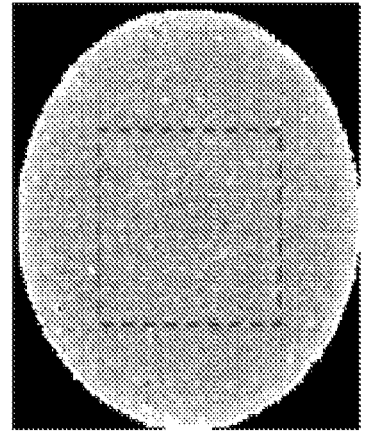
Figure 10:
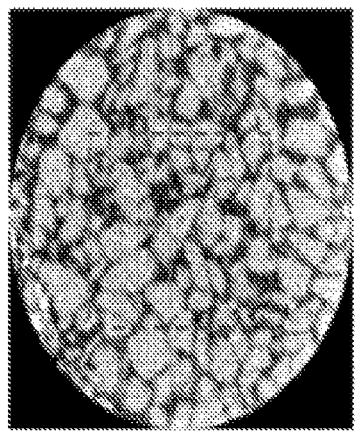
Figure 10:
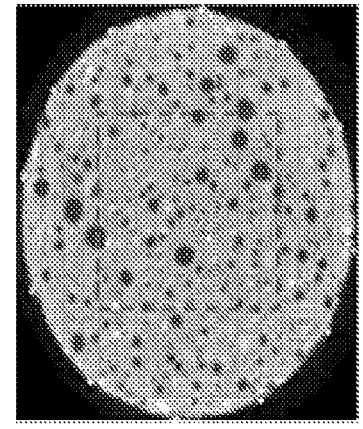
Figure 11A:
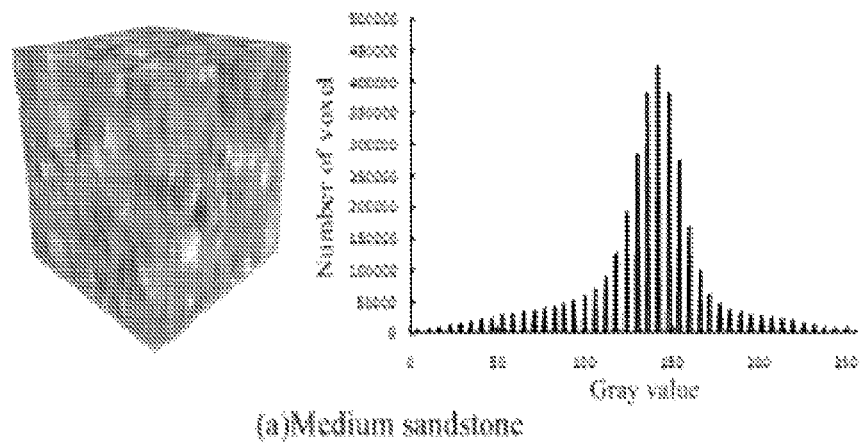
FIGS. 11A-11D show CT volume images and the corresponding histograms of the rocks and mortar.
Figure 11B:
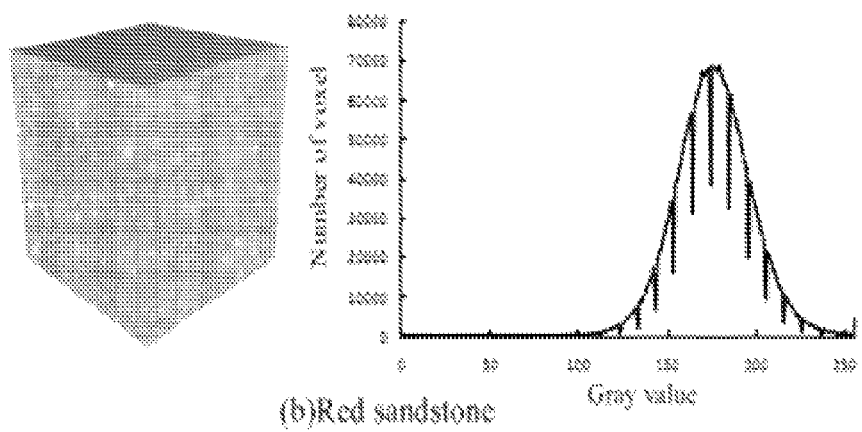
Figure 11C:
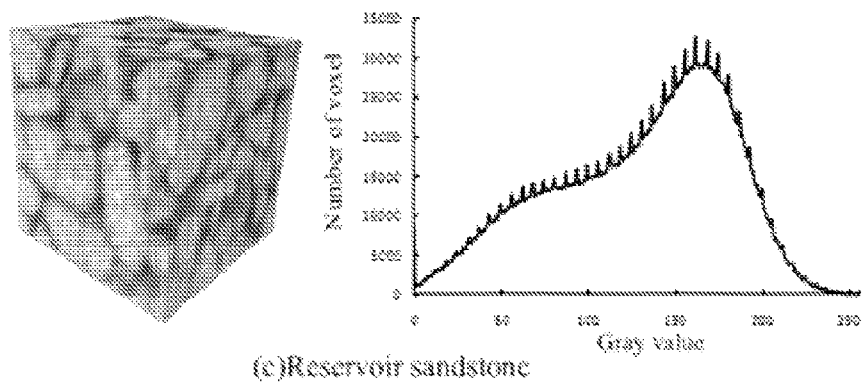
Figure 11D:
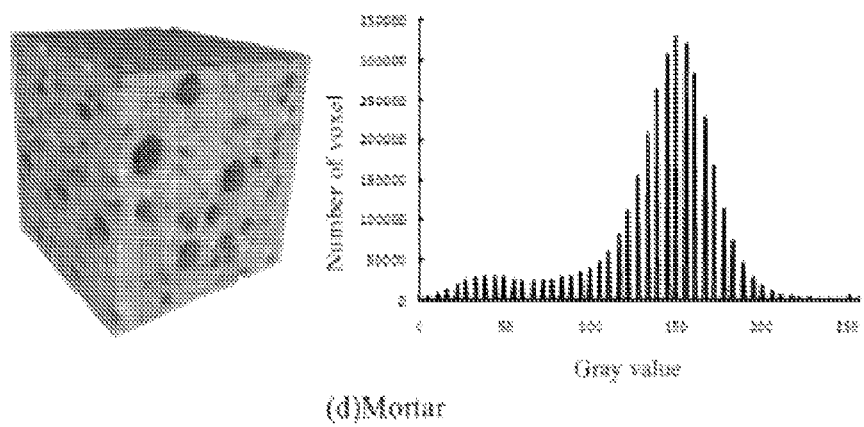

When applying CASI-3D to Porous rock materials of different compositions, the material's microstructure was directly used and studied. FIG. 10 illustrates some typical CT slice images of medium sandstone, reservoir sandstone, red sandstone, and mortar specimens, respectively. The internal structures of these rock materials form natural speckle patterns. Numerous experiments were performed to verify whether CASI-3D is applicable to these rock materials. These four kinds of materials were scanned by an Industrial Computer Tomography System. An example of such a system is the ACTIS 225/320 Industrial Computer Tomography System at the State Key Laboratory of Coal Resources and Safe Mining in China. The dimensions of the rocks and stones that were used are as follows: the medium sandstone, the red sandstone and the mortar specimens were all Φ25×50 mm, and the size of the reservoir sandstone was Φ3×10 mm.

A 200×200 pixels square area shown in FIG. 10 was cropped from the original slice image to reduce the computational expenses. The volume image of every rock sample was reconstructed with 200 slice images, such that the size of the volume image was 200×200×200 voxels. The volume images and their histograms are shown in FIG. 11. The histograms of the medium sandstone, the red sandstone, and the mortar were sharper than the reservoir sandstone. Based on the analysis in the previous section, these three kinds of rocks have better accuracy and precision results than that of the reservoir sandstone when subjected to CASI-3D analysis.

The previously mentioned different rock volume images are were used as reference volume images, and the "deformed" volume images were obtained by imposing sub-voxel displacements from 0.1 to 1.0 voxel along the z direction, which correspond to a shift of 0.1 voxel between two successive images. The displacement fields were calculated using a 32×32×32 voxel subset and a 64×64×64 voxel subset, respectively and shown in FIG. 12. The structural details of these rocks can be effectively represented with 3D speckle patterns in order to calculate interior displacement and strain fields.

Figure 12A:
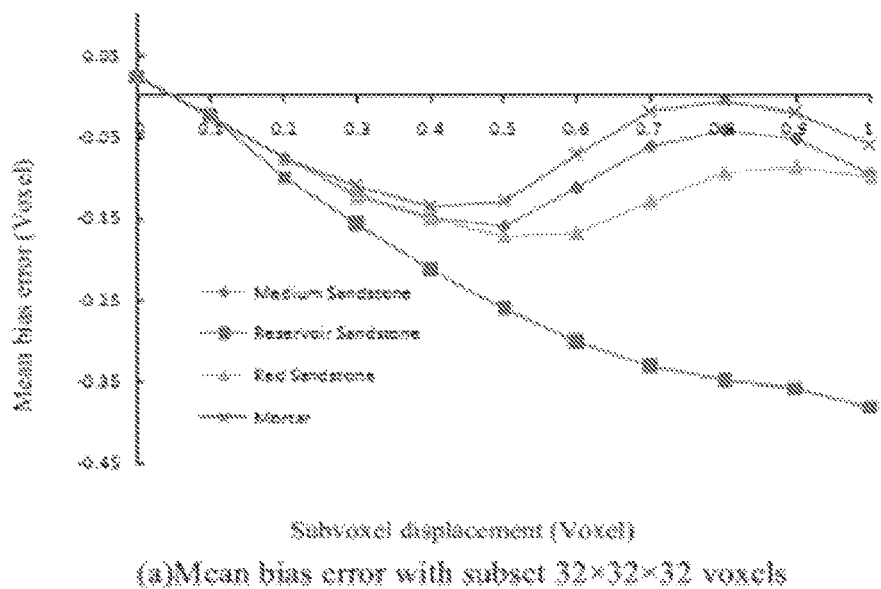
FIGS. 12A-12D show mean biases and standard deviations when calculating displacement fields with varying voxel subsets.
Figure 12B:
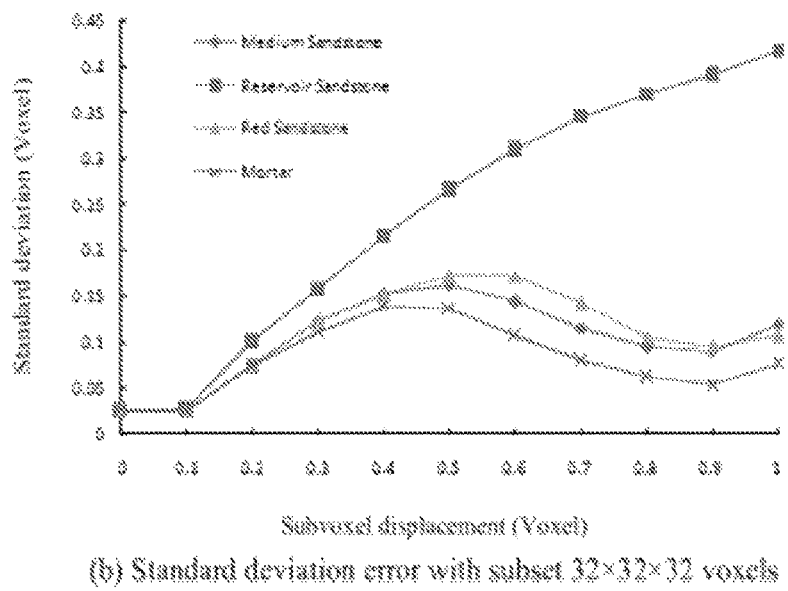
Figure 12C:
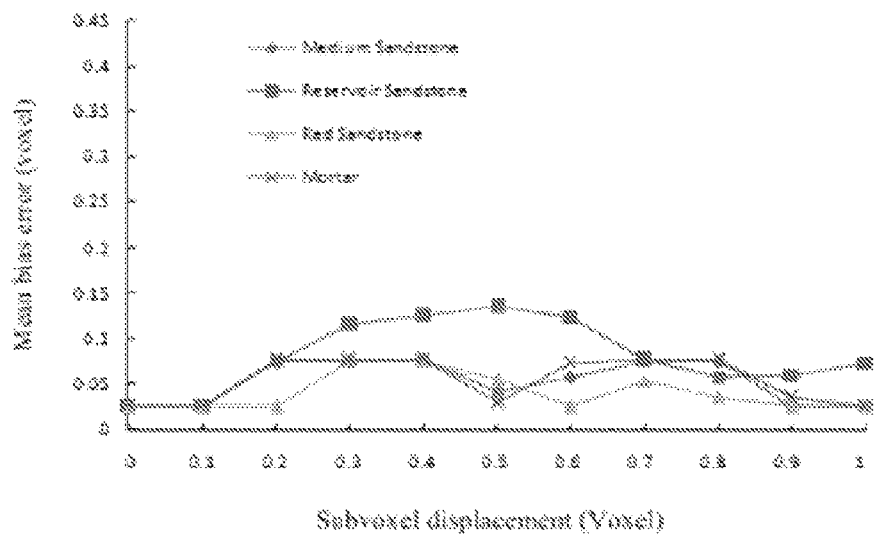
Figure 12D:
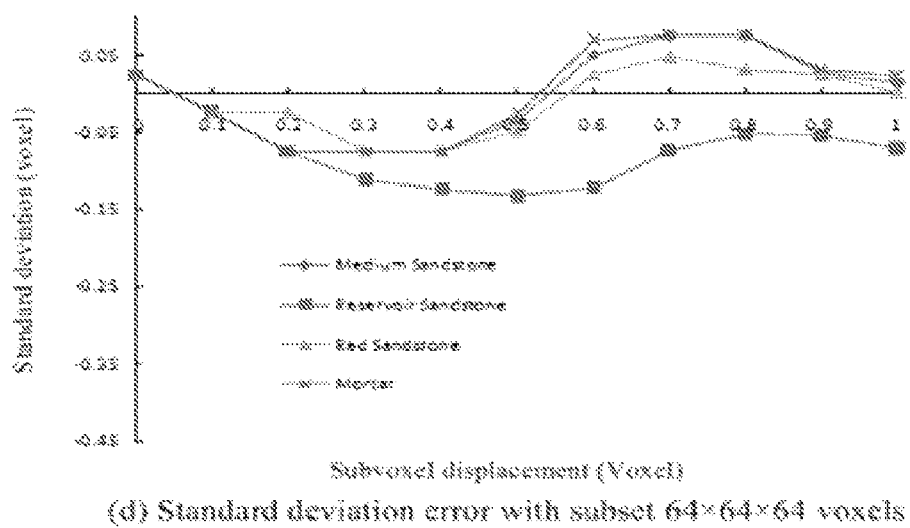

The speckle patterns of the medium sandstone, the red sandstone, and the mortar performed better in CASI-3D than the reservoir sandstone. FIGS. 12A and 12B revealed that when the subset size is 32×32×32 voxels, the accuracy and precision based on mortar internal structure was the best, followed by the results of medium sandstone ranks, and the red sandstone. The granules in reservoir sandstone were too large for a subset size of 32×32×32 voxels, resulting in large errors. As shown in FIGS. 12C and 12D, when the subset increased to 64×64×64 voxels, the results for all of these rocks displayed a higher accuracy and precision. The error for the reservoir sandstone dropped dramatically. The accuracy and precision of the red sandstone internal's structure is the best. Thus, selecting a suitable subset size is important to improve the accuracy and precision of calculation when using CASI-3D.

Example 7 (Effect of Artifacts and Imperfect Motion Influence of Tomography Systems)

The manner in which artifacts and imperfect motion influences of an Industrial Computer Tomography System (like the ACTIS 225/320) affect CASI-3D will be explored in this paragraph. CT slice images were reconstructed with the appropriate mathematical algorithms from different angular radiographic projections. The nonuniformity of detector elements, the polychromatic nature of X-ray, the imperfect motion of the rotation stage, and the possible rigid body of the specimen will all contribute to different artifacts, which in turn will affect the performance of CASI-3D. To determine the extent of the influence of a Tomography System on CASI-3D, two consecutive scans of the medium sandstone specimen with identical settings and conditions (i.e. without movement) were taken.

Figure 13A:
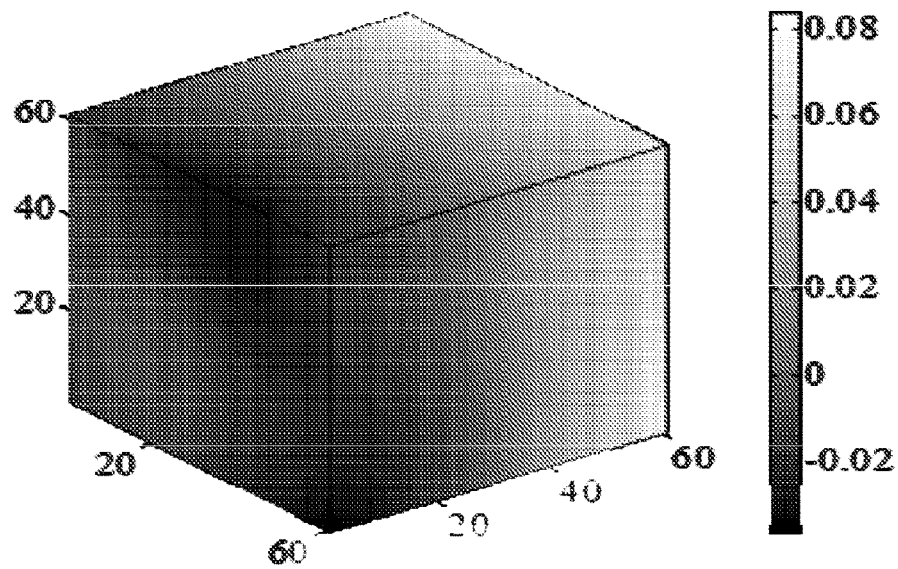
FIGS. 13A-13C shows 3D displacement fields and rotational errors caused by the influence of the ACTIS 225/350 Industrial Computer Tomography System.
Figure 13B:
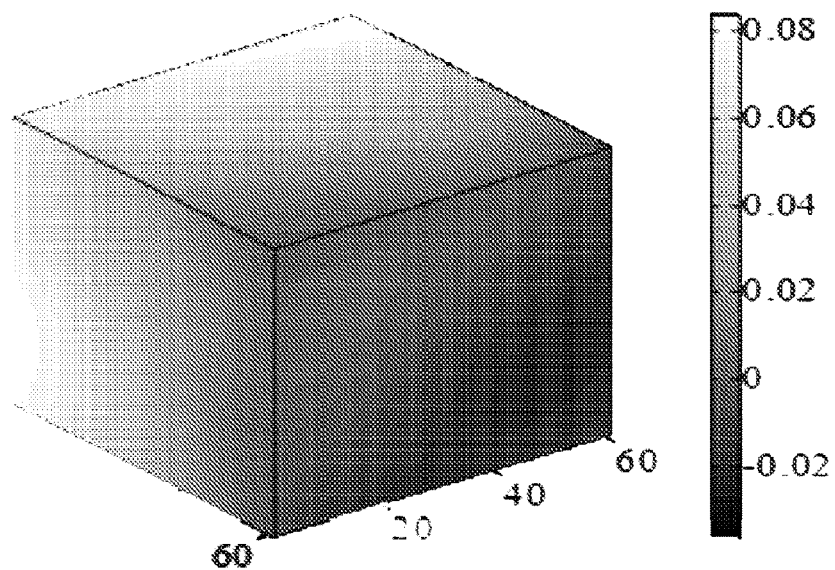
Figure 13C:
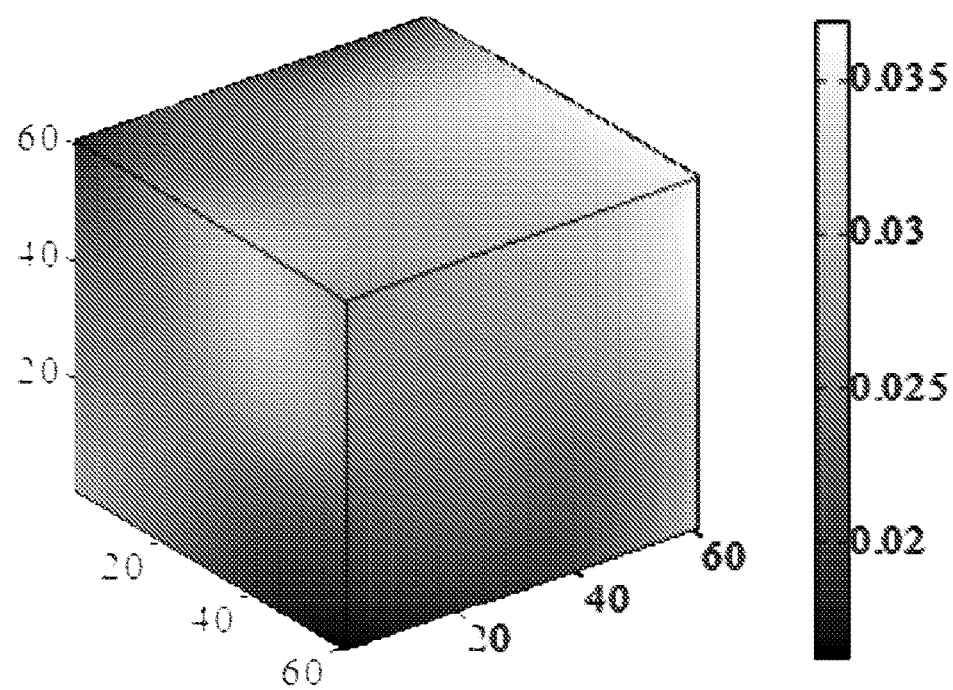
Figure 14A:
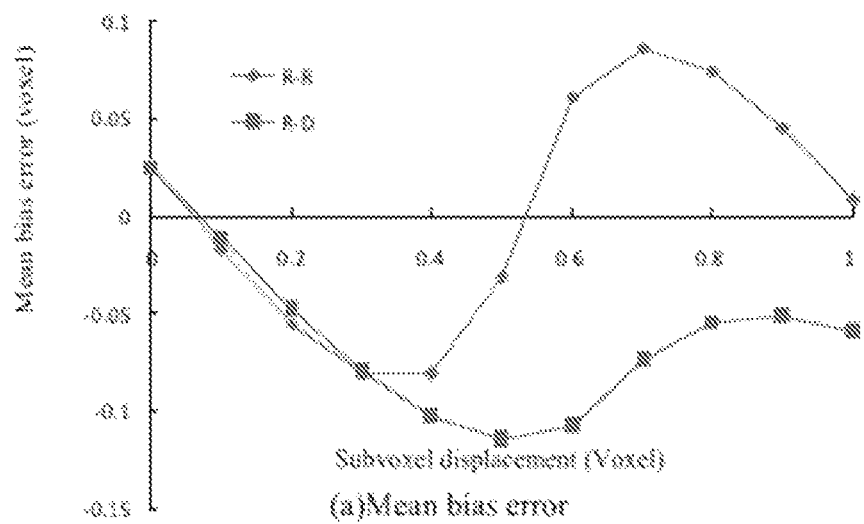
FIGS. 14A and 14B show mean biases and standard deviations when calculating displacement fields by CASI-3D.
Figure 14B:
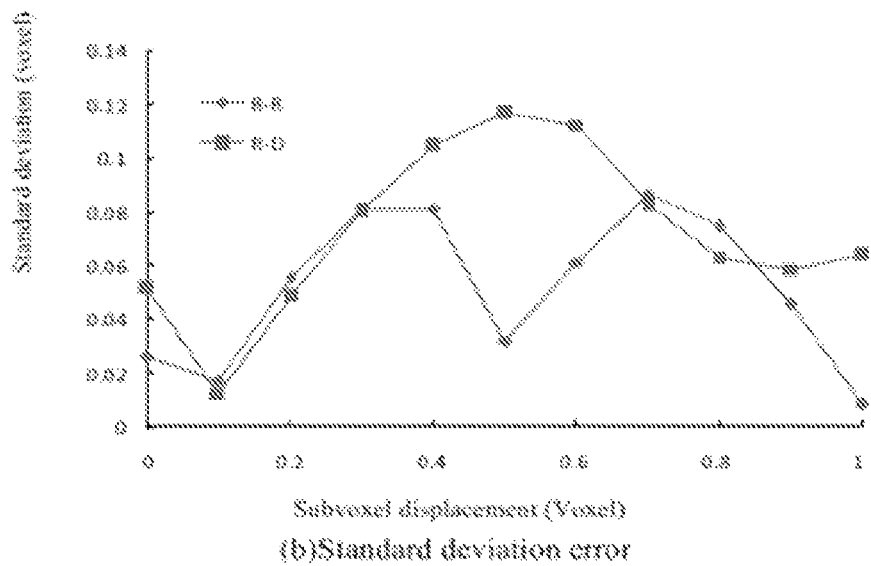

The displacement field computed by CASI-3D for this pair of volume images was zero everywhere, but mechanical perturbations in the scanner and scanner noise affected the result. In FIG. 13, the displacement fields in 3D contour plots caused by these two effects are shown. The volume image size is 200×200×200 voxels, the subset size is 64×64×64 voxels, the subset shift is 32 voxels, and the number of calculation points is 4×4×4. Based on the displacement of 4×4×4 points, the interpolation scheme was employed to obtain 61×61×61 displacement field arrays. Their 3D contours are illustrated in FIG. 13. The data in table 1 below shows the statistic errors due to the Tomography System's influence. During the scanning, the sample was rotated about the z axis. Due to this rotation, there was no translation or movement along the z axis. The table below shows the errors in u and v fields included of the difference in rotation positions between the two scans. This difference results in bigger errors in the u and v fields. The depictions in FIGS. 13A and 13B further show that there exists a tiny rotation error around the z axis between the two scans.

TABLE 1

The errors with artifacts influence
Table 1. The errors with artifacts influence

| Displacement | Min bias error(Voxel) | Max bias error(Voxel) | Mean bias error(Voxel) | STD (Voxel) |
|---|---|---|---|---|
| u | −0.0362 | 0.0837 | 0.0201 | 0.0398 |
| v | −0.0212 | 0.0938 | 0.0359 | 0.0490 |
| w | 0.0162 | 0.0362 | 0.0284 | 0.0290 |

Example 8 (Effect of Varying the Intensity of Voxel Points within the Subset)

Figure 15A:
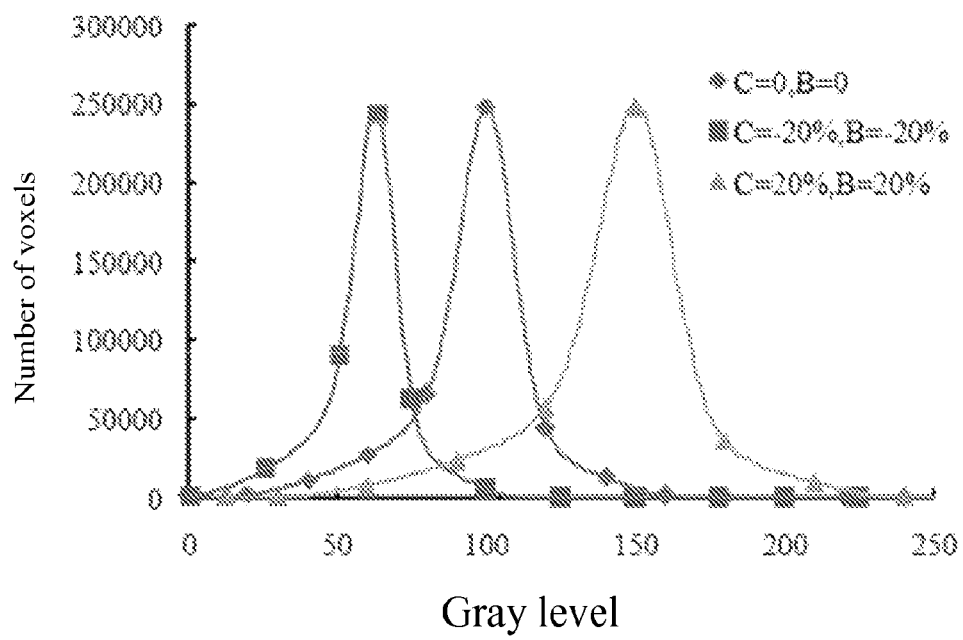
FIG. 15A shows a histogram of three "deformed" volume images.
Figure 15B:
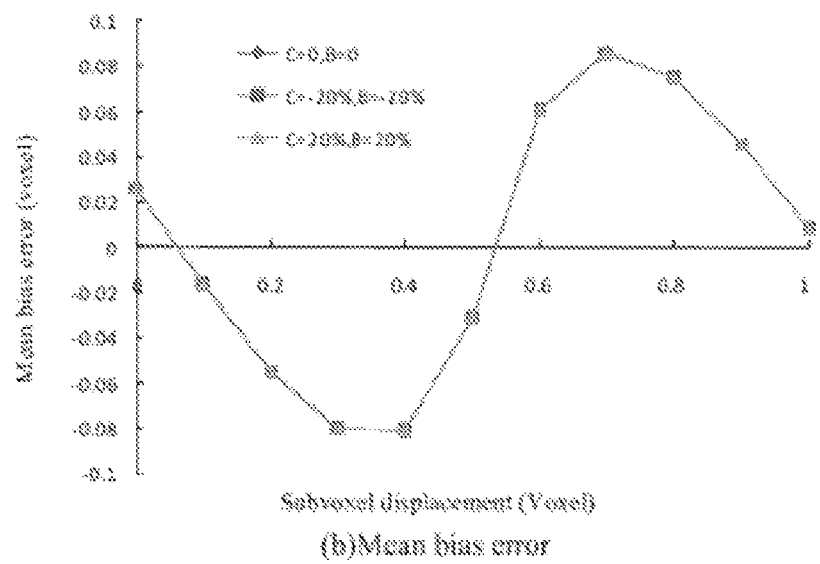
FIG. 15B shows the mean biases of the deformed volume images shown in FIG. 15A.

The manner in which intensity changes affects CASI-3D will be explored in this paragraph. Because of the nonlinear response of an imaging device or a sample deformation, the intensities of the voxel points within the subset may vary. For the purpose of analyzing the influence of intensity change, the medium sandstone CT volume images were used. The first scanned volume image was taken as the reference volume image, on which the virtual subvoxel displacements was imposed to produce the first "deformed" volume image. The deformed volume image was based on different contrast (C) and brightness (B) values. The second "deformed" volume image was given a 20% decrease in contrast and 20% decrease in brightness from the first deformed image. The third "deformed" volume image's contrast was then increased by 20% and its brightness was also increased by 20%. The histograms of these three "deformed" volume images are illustrated in FIG. 15A, and the mean bias errors are shown FIG. 15B. The results indicate that CASI-3D method is not sensitive to a change in intensity.

Example 9 (Calculating the Internal Strain Field from 3D Displacement)

We further explored the way in which an internal strain field may be calculated from 3D displacement fields. A point-wise least squares (PLS) approach may be used to calculate the strain field. Based on this approach, a regular cubic box can be selected and placed around each considered point. If the strain calculation window is small enough, the displacements in each direction can be assumed to be linear. Multiple linear regressions can then be used to determine the unknown polynomial coefficients with least-squares criteria. In addition the six Cauchy strain components can be also calculated. In an example, one red sandstone with dimensions of Φ25×50 mm and one medium sandstone with dimensions of Φ25×50, respectively, were scanned. For each of the two consecutive scans, a virtual uniform strain field in the volume images was generated. In order to save calculation time, a volume image with a subset of 200×200×200 voxels was selected. The reference volume image was scanned first for each sample.

Figure 16A:
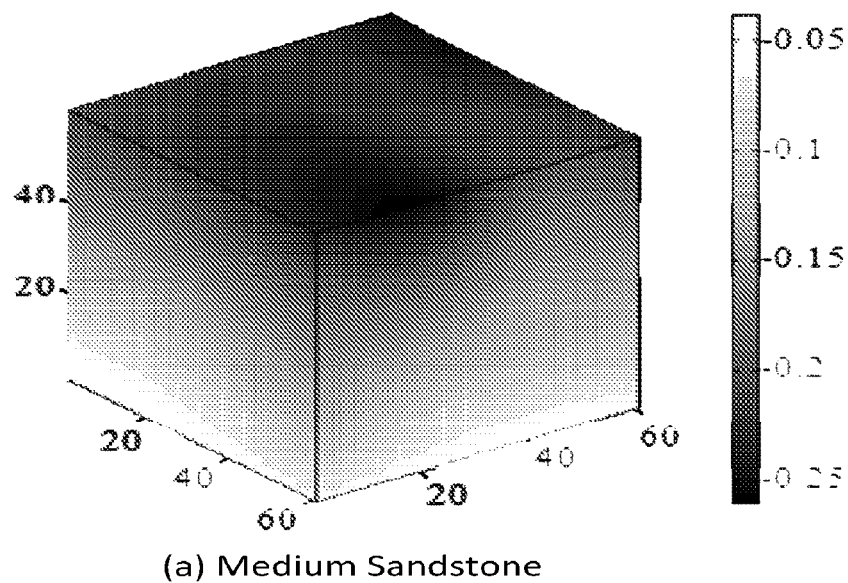
FIG. 16A shows the 3D displacement contour plot of medium sandstone after interpolation.
Figure 16B:
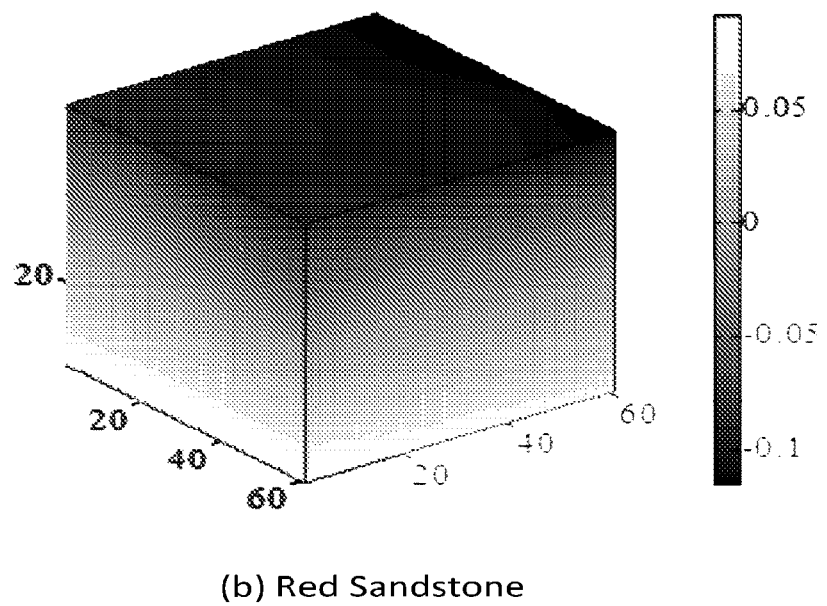
FIG. 16B shows the 3D displacement contour plot of red sandstone after interpolation.

An artificial uniaxial compression in the z axial direction with compression or strain value of 0.003 (i.e. −3000 microstrain) was then imposed on the second scan. These images included effects from CT scanner noises and imperfect motion. The subset size used was 64×64×64 voxels, the subset shift was 32 voxels, and the number of calculation points was 4×4×4. FIG. 16A shows the displacement 3D contour plot of w field of the medium sandstone after a proper interpolation. The mean strain value was −2968με, and the standard deviation error was 142με (4.7%). FIG. 16B shows the displacement 3D contour plot of w field of the red sandstone after interpolation. The mean strain value was −2952με, and the standard deviation error was 78με (2.6%). The textural structure of the red sandstone was smaller than that of the medium sandstone, which is beneficial for CASI-3D performance. Besides the CT noise and imperfect motion, the difference between the speckle structures in sandstone and the ideal speckle structure of the sandstone contributed to the errors.

All publications and patents mentioned in the above specification are incorporated by reference in this specification in their entireties. Various modifications and variations of the described materials and methods will be apparent to those skilled in the art without departing from the scope and spirit of the invention. Although the disclosure has been described in connection with specific preferred embodiments, it should be understood that the invention as claimed should not be unduly limited to such specific embodiments. Indeed, those skilled in the art will recognize, or be able to ascertain using the teaching herein and no more than routine experimentation, many equivalents to the specific embodiments of the invention described herein. Such equivalents are intended to be encompassed by the following claims.

We claim:

1. A method of determining the interior three-dimensional movement, deformation, and strain of an object by an imaging device and a computational device, the method comprising:
utilizing an imaging device in:
constructing a reference volume image of an object;
constructing a deformed volume image of the object, wherein the deformed volume image represents the object after an applied stress and strain;
utilizing a computational device in:
comparing the reference volume image and the deformed volume image to determine at least one displacement vector in at least one of the x, y, and z directions;
determining interior movement of the object based upon the at least one displacement vector in at least one of the x, y, and z directions;
dividing the reference volume image into a reference image subset, wherein the reference image subset comprises voxel arrays;
dividing the deformed volume image into a deformed image subset, wherein the deformed image subset comprises voxel arrays;
comparing the reference image subset and the deformed image subset based upon a comparison of sizes of speckle features in the object,
wherein comparing the reference image subset and the deformed image subset comprises:
applying a first-step fast Fourier transform to a plurality of speckle subset pairs selected from the reference image subset and the deformed image subset;
constructing a new resultant spectrum based upon results of the first-step fast Fourier transform;
applying a second-step fast Fourier transform to the new resultant spectrum;
determining a crest of an expanded impulse function from the results of the second-step Fast Fourier transform; and
providing an output quantifying the results of the comparison.

2. The method of claim 1, wherein:
the speckle features comprise at least one of naturally occurring and artificially seeded materials.

3. The method of claim 1, further comprising:
determining at least one displacement vector between two subsets based on the crest of the expanded impulse function.

4. The method of claim 3, further comprising:
obtaining an array of displacement vectors of a plurality of subsets by determining displacement vectors of a plurality of subsets based on the crest of the expanded impulse function.

5. The method of claim 4, further comprising:
calculating strain tensors based upon the array of the plurality of displacement vectors of a plurality of subsets.

6. The method of claim 5, further comprising:
calculating the strain tensors based on an iterative least-squares algorithm.

7. A system of determining the interior three-dimensional movement, deformation, and strain of an object, wherein the system comprises:
an imaging device utilized to:
construct a reference volume image of an object;
construct a deformed volume image of the object, wherein the deformed volume image represents the object after an applied stress and strain; and
a computational device utilized to:
compare the reference volume image and the deformed volume image to determine at least one displacement vector in at least one of the x, y, and z directions;
determine interior movement of the object based upon the at least one displacement vector in at least one of the x, y, and z directions;
divide the reference volume image into a reference image subset, wherein the reference image subset comprises voxel arrays;
divide the deformed volume image into a deformed image subset, wherein the deformed image subset comprises voxel arrays;

compare the reference image subset and the deformed image subset based upon a comparison of sizes of speckle features in the object; and provide an output quantifying the results of the comparison, wherein comparing the reference image subset and the deformed image subset comprises utilizing the computational device to:

apply a first-step Fourier transform to a plurality of speckle subset pairs selected from the reference image subset and the deformed image subset;

constructing a new resultant spectrum based upon results of the first-step fast Fourier transform;

apply a second-step Fourier transform to the new resultant spectrum; and determine a crest of an expanded impulse function from the results of the second-step Fast Fourier transform.

8. The system of claim 7, wherein: the speckle features comprise at least one of naturally occurring and artificially seeded materials.

9. The system of claim 7, further comprising:
utilizing the computational device to:
determine at least one displacement vector between two subsets based on the crest of the expanded impulse function.

10. The system of claim 9, further comprising:
utilizing the computational device to:
obtain an array of displacement vectors of a plurality of subsets by determining displacement vectors of a plurality of subsets based on the crest of the expanded impulse function.

11. The system of claim 10, further comprising:
utilizing the computational device to:
calculate strain tensors based upon the array of displacement vectors of a plurality of subsets.

12. The system of claim 11, wherein the strain tensors are calculated based on:
utilizing the computational device to calculate an iterative least-squares algorithm.

* * * * *